Nov. 18, 1969    K. HAIDE    3,478,515

OVERDRIVE TORQUE CONVERTER WITH ADJUSTABLE AXIAL TURBINE BLADES

Filed May 2, 1967

INVENTOR.
Karl Haide

United States Patent Office 3,478,515
Patented Nov. 18, 1969

3,478,515
OVERDRIVE TORQUE CONVERTER WITH ADJUSTABLE AXIAL TURBINE BLADES
Karl Haide, Friedrichshafen-Jettenhausen, Germany, assignor to Maybach Mercedes-Benz Motorenbau G.m.b.H., Friedrichshafen, Germany
Filed May 2, 1967, Ser. No. 635,478
Claims priority, application Germany, May 13, 1966, M 69,486
Int. Cl. F16d 33/04; F16h 41/12, 41/24
U.S. Cl. 60—54          7 Claims

ABSTRACT OF THE DISCLOSURE

A Föttinger-type overdrive torque converter which includes within a housing a centrifugal-type pump wheel, an axial flow turbine wheel and a guide wheel as well as blades arranged between an outer and an inner turbine wheel ring whereby the blades are individually adjustable about radially extending axes and are fixed in a particular position corresponding to the desired torque converter properties. The pump wheel is preferably of the type having a radially outwardly decreasing flow area and as large as possible an outlet diameter while the guide wheel is arranged between two substantially parallel planes normal to the torque axis. The inner and outer rings are provided with mutually facing spherical surfaces of different radii with the centers coinciding substantially with the axis of the torque converter, the adjusting axes of the turbine blades also passing through the common center point.

BACKGROUND OF THE INVENTION

Figure 1:
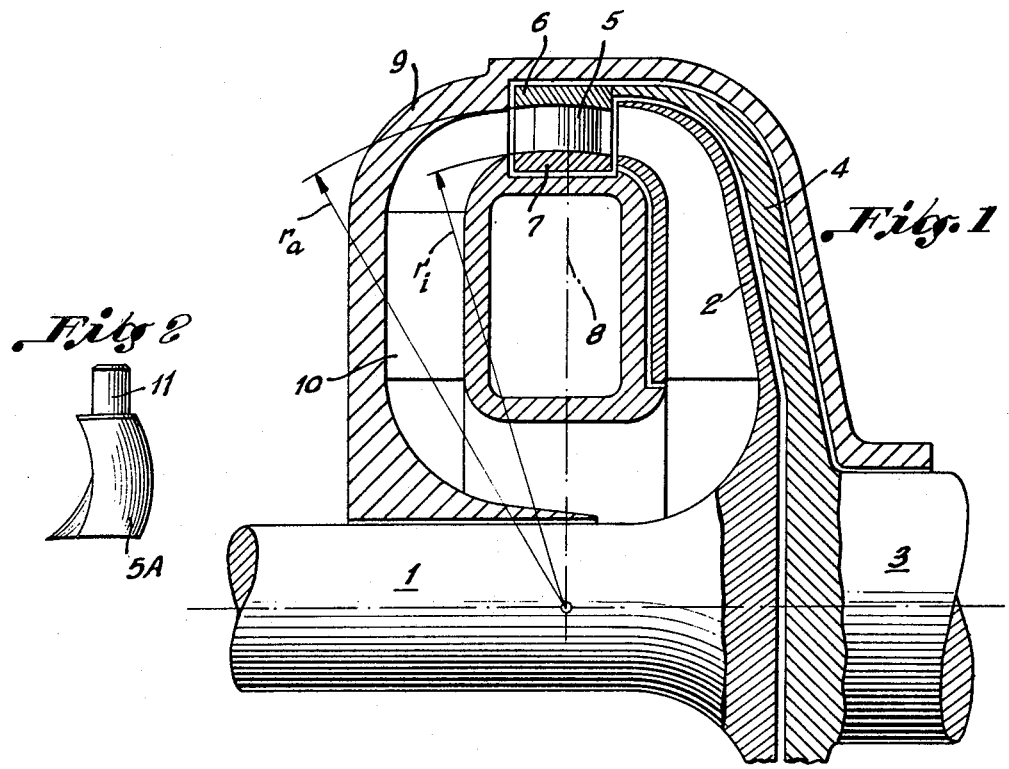

The present invention relates to a Föttinger-type overdrive torque converter, comprising a centrifugal-type pump wheel, preferably with a radially outwardly decreasing flow area and in particular with as large as possible an outlet diameter, an axial-flow turbine wheel adjoining the pump wheel, and a housing containing the guide blades or vanes which are preferably arranged between two parallel planes disposed perpendicular to the axis of the torque converter.

The $\psi_k$ value of such an overdrive torque converter, i.e., the ratio of the turbine rotational speed $n_T$ to the pump wheel rotational speed $n_P$ within the range of maximum efficiency, is $>1$, that is, the turbine wheel speeds are higher than the pump wheel speeds. At a constant input or pump wheel speed $n_P$ the input power of the pump wheel remains constant in dependence on this ratio over the entire turbine wheel speed range in this type of torque converter.

With the employment of such overdrive torque converters in Diesel-hydraulically operated rail vehicles, the Diesel engine should run with as constant a speed as possible. The Diesel engine then operates economically with always the same rating or at the same operating point and with a constant output, independently from the driving speed, i.e., independently from the turbine speed. This is only possible if the power input of the torque converter remains constant over the entire speed range of the turbine. The overdrive torque converters can also be operated especially in the partial load range, since even at low engine speeds within a favorable efficiency range an output speed corresponding to the driving speed can still be obtained.

Overdrive torque converters are also advantageous for applications in marine transmissions. In this case it is required, for example, to propel the ship in the cruising speed range by means of a normal Diesel engine, and to engage only in the maximum speed range a gas turbine serving as additional power source. The higher driving output obtained by the engagement of the gas turbine results in an increase of the propeller speed of the ship. To obtain a satisfactory efficiency of the Diesel engines also at this increased rotational speed of the propeller, it is necessary that a torque converter be available, which still operates with a high efficiency notwithstanding this increased propeller speed, i.e., corresponding to the higher output speed of the turbine.

SUMMARY OF THE INVENTION

To achieve different series of torque converter constructions each consisting of identical parts and having different $\psi_k$ values, i.e., having maximum efficiency rate at various output/input speed ratios, the blades are arranged, according to the present invention, individually adjustable about radially extending axes between an outer and an inner ring of the axial type turbine-wheel and are secured or fixed in a given position corresponding to the intended torque converter properties and characteristics for a given series of types of torque converter constructions.

In order that the blades abut completely gap-free against the rings of the turbine wheel, in all possible positions for each type of the series of torque converter constructions, according to a further improvement of the present invention, use is made in an analogous manner of the design properties known in connection with the Kaplan-Turbine construction, and more particularly, in that the outer ring part of the turbine wheel is limited inwardly thereof and the inner ring part is limited outwardly thereof by the zones about the largest diameter (equatorial zones) of two concentric spheres, i.e., the inner and outer contours of the outer and inner ring parts of the turbine wheel accommodating therebetween the blades, are spherical surfaces whose common center point is located in the torque converter axis, and in that the end surfaces of the blades disposed on the spherical zones, i.e., abutting against the spherical surfaces of the turbine wheel ring parts are also spherically shaped while the radial axes about which the blades can be adjusted, extend through the common center point of the spheres.

Hence, the turbine blades can be designed to maintain optimum flow conditions, whereby advantageously a mean optimum value is selected for the blade design with which also in the positions of extreme values of the torque converter design, i.e., at the lowest and highest turbine speeds still suitable flow conditions are obtained.

Particularly preferred for an even more simple manufacture are turbine blades, which are cylindrically shaped throughout from one end to the other.

Accordingly, it is an object of the present invention to provide a Föttinger-type overdrive torque converter which is simple in construction and obviates the aforementioned shortcomings encountered with the prior art constructions.

It is another object of the present invention to provide an overdrive torque converter of the type described above which permits operation of the driving engine at as constant as possible a rotational speed.

A further object of the present invention resides in an overdrive torque converter provided with blades individually adjustable to achieve a maximum efficiency at various output-input speed ratios for various types of torque converter constructions using identical parts for the construction of the different series of torque converters.

Figure 2:
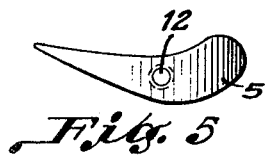
Figure 5:
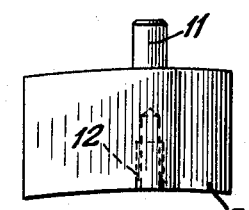
Figure 7:
Figure 6:
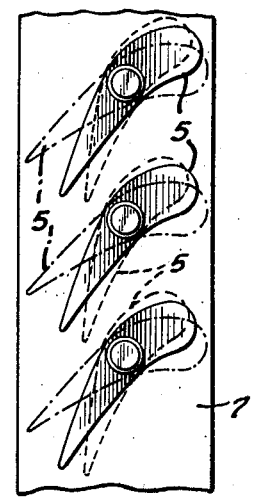
Figure 8:
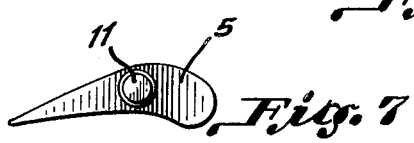
Figure 3:
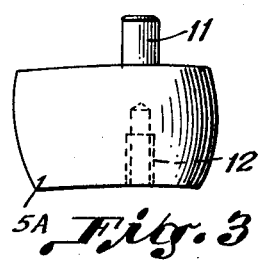
Figure 4:

These and other objects, features, and advantages of the present invention, will become more obvious from the following description when taken in connection with the accompanying drawing which shows, for purposes of illustration only, several embodiments in accordance with the present invention, and wherein:

FIGURE 1 is a longitudinal cross-sectional view through the upper half of an overdrive torque converter according to the present invention, predominantly in schematic representation and on a larger scale;

FIGURES 2, 3, and 4 are, respectively, a side elevational view, a front elevational view, and a bottom view of a spherically curved blade for optimum flow conditions according to the present invention;

FIGURES 5 to 7 are, respectively, top, front and bottom elevational views of a cylindrical blade in accordance with the present invention; and FIGURE 8 is a developed projection of the plan view on the turbine wheel blading after removal of the outer ring, illustrating various positions of the adjustable blades.

Referring now to the drawing wherin like reference numerals are used throughout the various views to designate like parts, and more particularly to FIGURE 1, a centrifugal pump wheel 2 with a flow area decreasing radially outwardly and having the largest possible outlet diameter is mounted on an input shaft 1 of the overdrive torque converter. An output shaft 3 carries the turbine wheel 4 provided with the axially loaded blading 5 through which flows the liquid and which is arranged between an outer ring-shaped part 6 and an inner ring-shaped part 7. The blades of the blading 5 are individually adjustable about axes 8 extending radially in the torque converter and can be fastened or fixed separately for each desired converter-type as required. Furthermore, the torque converter consists of the housing 9 enclosing the two wheels 2 and 4. The housing 9 contains in its left part the guide vanes 10 arranged between two parallel planes extending transversely to the torque converter axis 1, 3.

According to the present invention, the outer ring part 6 of the turbine wheel 4 is delimited by the zone about the largest diameter (equatorial zone) of the sphere having the radius $r_a$ while the inner ring part 7 of the turbine wheel 4 is delimited by the zone about the largest diameter (equatorial zone) of a sphere having the radius $r_i$. In other words, the outer ring part 6 of the turbine wheel 4 has a spherical surface with a maximum diameter (equatorial zone) of a sphere with a radius $r_a$ while the inner ring part 7 of the turbine wheel 4 has a spherical surface with a maximum diameter (equatorial zone) of a sphere having the radius $r_i$. The center point of both spheres having the radii $r_a$ and $r_i$ coincide with the torque converter shaft axis, 1, 3. The adjusting axes 8 of the turbine blades 5 also extend through this common center point.

The turbine blades can be designed three-dimensionally, for example, like the blades 5A shown in FIGURES 2, 3, and 4.

However, also simplified blades with a standard profile can be used, which taper conically from the outer end to the inner end thereof.

The most simple design are the blades as shown in FIGURES 1, 5, 6 and 7. In FIGURE 8 such blades are indicated in full lines, and shown in plan view as viewed from the outside thereof and in a position thereof for a torque converter type with a mean or average speed ratio, i.e., an average $\psi_k$ value, as development projection onto the inner ring part 7. The blades shown in FIGURE 8 are used with torque converter-types designed for low speed ratios, i.e., with a low $\psi_k$ value whereas the blades shown in FIGURE 8 in dash and dot lines are used in torque converter types for high speed ratios, i.e., high $\psi_k$ values.

The blades 5 or 5A are inserted into the outer ring part 6 by means of pins 11 and are secured at the inner ring part 7 by bolts or the like within threads 12.

While I have shown and described several embodiments in accordance with the present invention, it is understood that the same is not limited thereto but is susceptible of numerous changes and modifications as known to a person skilled in the art, and I therefore do not wish to be limited to the details shown and described herein but intend to cover all such changes and modifications as are encompassed by the scope of the appended claims.

I claim:

1. A torque converter having an axis of rotation and including a centrifugal-type pump wheel, an axial flow turbine wheel at the pump outlet, a guide wheel between the turbine outlet and the pump inlet, and a housing defining in part a torodial flow circuit, wherein the improvement comprises said axial flow turbine wheel having an outer ring part being provided with an inside spherically shaped surface, and an inner ring part being provided with an outside spherically shaped surface; a plurality of blades between the outer ring part and the inner ring part of the turbine wheel; said blades having radially inner and outer edges spherically curved complementary to and closely sealing adjacent to the inner and outer ring part spherically shaped surfaces, respectively; each blade being mounted for selective angular adjustment about a respective substantially radially extending axis during assembly; the centers of curvature of the two spherically shaped surfaces of said inner and outer parts substantially coinciding with the intersection between the axis of rotation of the torque converter and said blade axes; means selectively fixing the blades during assembly in a predetermined angular adjustment corresponding to the desired torque converter properties, whereby different types of torque converters having a maximum efficiency rate at various output-input speed ratios may be constructed of substantially identical parts.

2. A torque converter according to claim 1, wherein said centrifugal-type pump wheel has a radially outwardly decreasing flow area and a largest through-flow diameter substantially equal to the largest through-flow diameter of said axial flow turbine wheel.

3. A torque converter according to claim 2, wherein the guide wheel is arranged between two substantially parallel planes extending transversely to the torque converter axis.

4. A torque converter according to claim 1, wherein each of said blades has a profile designed for optimum flow conditions at a mean angular position of adjustment.

5. A torque converter according to claim 1, wherein said blades are frusto-conically shaped from their radially outer ends toward their radially inner ends.

6. A torque converter according to claim 1, wherein said blades have generatrices parallel from their radially outer ends to their radially inner ends.

7. A torque converter according to claim 1, wherein said blades each have a compound curvature.

References Cited

UNITED STATES PATENTS

| | | | |
|---|---|---|---|
| 2,212,774 | 8/1940 | Guyer | 192—58 |
| 2,634,584 | 4/1953 | Burnett | 60—54 |
| 2,795,153 | 6/1957 | Russell | 60—54 XR |
| 2,933,951 | 4/1960 | Russell | 60—54 XR |
| 2,995,955 | 8/1961 | Kelley | 60—54 XR |

EDGAR W. GEOGHEGAN, Primary Examiner

U.S. Cl. X.R.

192—58